United States Patent
Khan et al.

(10) Patent No.: US 11,858,239 B2
(45) Date of Patent: Jan. 2, 2024

(54) POLYMER-GRAPHENE ENERGY ABSORBING COMPOSITE STRUCTURES AND METHODS OF MANUFACTURE

(71) Applicant: Aisin Technical Center of America, Inc., Northville, MI (US)

(72) Inventors: Saida Khan, Canton, MI (US); Santosh Sarang, Novi, MI (US); Masahiro Narita, Novi, MI (US)

(73) Assignee: Aisin Technical Center of America, Inc., Northville, MI (US)

( * ) Notice: Subject to any disclaimer, the term of this patent is extended or adjusted under 35 U.S.C. 154(b) by 0 days.

(21) Appl. No.: 17/481,732

(22) Filed: Sep. 22, 2021

(65) Prior Publication Data
US 2023/0091672 A1    Mar. 23, 2023

(51) Int. Cl.
*B32B 27/06*      (2006.01)
*B32B 27/18*      (2006.01)
(Continued)

(52) U.S. Cl.
CPC ........ *B32B 27/065* (2013.01); *B29C 45/0001* (2013.01); *B32B 5/18* (2013.01);
(Continued)

(58) Field of Classification Search
None
See application file for complete search history.

(56) References Cited

U.S. PATENT DOCUMENTS

| | | | |
|---|---|---|---|
| 6,884,823 B1 * | 4/2005 | Pierick | B29C 48/74 |
| | | | 521/142 |
| 8,299,159 B2 | 10/2012 | Chandrasekhar et al. | |

(Continued)

FOREIGN PATENT DOCUMENTS

| | | | | |
|---|---|---|---|---|
| CN | 111590987 A | * | 8/2020 | ............. G10L 19/10 |
| DE | 102014015870 A1 | | 4/2016 | |

(Continued)

OTHER PUBLICATIONS

Jang et al., Polyolefin Based Resin Foam, Jun. 3, 2021, machine translation of WO 2021107722 (Year: 2021).*

(Continued)

*Primary Examiner* — Hai Vo
(74) *Attorney, Agent, or Firm* — Christopher G. Darrow; Darrow Mustafa PC (57) ABSTRACT

A composite structure includes a foam core formed from a first polymer and between about 0.5 wt. % and about 2.5 wt. % graphene. The foam core has an average pore size between about 25 μm and about 75 μm, and a cell density between about $4 \times 10^6$ cells/mm$^2$ and about $6 \times 10^6$ cells/mm$^2$. Also, an overmolded skin formed from a second polymer and between about 0.25 wt. % and about 5.0 wt. % graphene is disposed on the foam core. A method of manufacturing a composite structure includes injection molding a foam core from a first polymer containing between about 0.25 wt. % and about 5.0 wt. % graphene, and injection molding an overmolded skin from a second polymer containing graphene between about 0.25 wt. % and about 5.0 wt. % graphene.

7 Claims, 5 Drawing Sheets

(51) Int. Cl.
  *B32B 27/32* (2006.01)
  *B29C 45/00* (2006.01)
  *B32B 5/18* (2006.01)
  *B29C 44/12* (2006.01)
  *B29C 45/14* (2006.01)
  *B29K 507/04* (2006.01)
  *B29K 23/00* (2006.01)
  *B29K 105/04* (2006.01)

(52) U.S. Cl.
  CPC .............. *B32B 27/18* (2013.01); *B32B 27/32* (2013.01); *B29C 44/1285* (2013.01); *B29C 45/14* (2013.01); *B29K 2023/12* (2013.01); *B29K 2105/041* (2013.01); *B29K 2507/04* (2013.01); *B32B 2250/02* (2013.01); *B32B 2250/242* (2013.01); *B32B 2264/108* (2013.01); *B32B 2266/025* (2013.01); *B32B 2266/104* (2016.11); *B32B 2307/56* (2013.01); *B32B 2605/08* (2013.01)

(56) References Cited

U.S. PATENT DOCUMENTS

| | | | |
|---|---|---|---|
| 9,117,568 B2 | 8/2015 | Scheffer et al. | |
| 9,447,251 B2 | 9/2016 | Lettow | |
| 9,718,932 B2 | 8/2017 | Guha | |
| 2004/0229966 A1* | 11/2004 | Dontula | B41M 5/52 521/73 |
| 2011/0088931 A1 | 4/2011 | Lettow et al. | |
| 2011/0133134 A1 | 6/2011 | Varma et al. | |
| 2012/0142832 A1 | 6/2012 | Varma et al. | |
| 2012/0195004 A1* | 8/2012 | Miller | H01L 23/3737 361/705 |
| 2012/0277360 A1 | 11/2012 | Scheffer et al. | |
| 2016/0035456 A1 | 2/2016 | Sauro et al. | |
| 2016/0115293 A1 | 4/2016 | Aksay et al. | |
| 2018/0072863 A1 | 3/2018 | Scheffer et al. | |
| 2022/0049064 A1* | 2/2022 | Mercx | C08J 9/16 |

FOREIGN PATENT DOCUMENTS

| | | | | |
|---|---|---|---|---|
| WO | 2014168979 A1 | 10/2014 | | |
| WO | WO-2014168979 A1 * | 10/2014 | ............ | B29C 70/04 |
| WO | 2021001298 A1 | 1/2021 | | |
| WO | WO-2021107722 A1 * | 6/2021 | ............ | C08J 9/0066 |

OTHER PUBLICATIONS

Translation of CN 111590987A, Chen et al., Aug. 28, 2020. (Year: 2020).*

Ho et al., "Stabilization of the Cellular Structure of Polypropylene Foams and Secondary Nucleation Mechanism in the Presence of Graphene Nanoplatelets", Polymer 198 (2020) 122506 (Year: 2020).*

* cited by examiner

POLYMER-GRAPHENE ENERGY ABSORBING COMPOSITE STRUCTURES AND METHODS OF MANUFACTURE

TECHNICAL FIELD

The present disclosure relates generally to composite structures and, more particularly, to polymer-graphene composite structures.

BACKGROUND

It is generally understood that reducing the weight of a vehicle, e.g., an automobile, reduces the energy required to accelerate the vehicle and thereby increases its fuel economy. Also, a technique known as "lightweighting" reduces vehicle weight by replacing a component made from a traditional material of construction with a component made from a lighter material. However, such a replacement should not reduce or inhibit desired mechanical properties and/or performance of the vehicle.

The present disclosure addresses issues related to lightweighting vehicle components while maintaining or enhancing desired mechanical properties, and other issues related to lightweighting.

SUMMARY

This section provides a general summary of the disclosure, and is not a comprehensive disclosure of its full scope or its features.

In one form of the present disclosure, a component includes a composite structure with a foam core formed from a first polymer and graphene, and an overmolded skin formed from a second polymer and graphene disposed on the foam core.

In another form of the present disclosure, a component includes a composite structure with a foam core and an overmolded skin formed on the foam core. The foam core is formed from a first polymer with between about 0.5 wt. % and about 2.5 wt. % graphene, has an average pore size between about 25 μm and about 75 μm, and a cell density between about $4 \times 10^6$ cells/mm$^2$ and about $6 \times 10^6$ cells/mm$^2$. The overmolded skin is formed from a second polymer with between about 0.25 wt. % and about 5.0 wt. % graphene.

In still another form of the present disclosure, a method of manufacturing a composite structure includes injection molding a foam core from a first polymer with between about 0.25 wt. % and about 5.0 wt. % graphene, and injection molding an overmolded skin onto the foam core. The overmolded skin is formed from a second polymer with between about 0.25 wt. % and about 5.0 wt. % graphene. Also, the foam core has an average pore size between about 25 μm and about 75 μm, and a pore density between about $4 \times 10^6$ cells/mm$^2$ and about $6 \times 10^6$ cells/mm$^2$.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 9 is a plot of flexure stress versus flexure strain for: a solid core (layer) sample made from PP (A: PP Solid Core); a solid core sample made from PP-0.5 wt. % graphene (Gr) (B:PP-0.5 Gr Solid Core); a foam core sample made from PP and having a 5% weight reduction compared to the PP solid core (C:PP Foam Core); a foam core sample made from PP-1 wt. % Gr and having a 5% weight reduction compared to the PP solid core (D:PP-1 Gr Foam Core); a composite structure sample made from a PP-1.0 wt. % Gr foam core having a 5% weight reduction compared to the PP solid core and sandwiched between a pair of 1.0 mm thick PP-1 wt. % Gr overmolded solid skins (E: PP-1 Gr Foam Core w/ 1 mm PP-1 Gr Skins); and a composite structure sample made from a PP-0.5 wt. % Gr foam core having a 5% weight reduction compared to the PP solid core and sandwiched between a pair of 1.5 mm thick PP-0.5 wt. % Gr overmolded solid skins (F: PP-0.5 Gr Foam Core w/ 1.5 mm PP-0.5 Gr Skins); and FIG. 10 is a plot of flexure stress versus flexure strain for: a solid core sample made from PP (A: PP Solid Core); a solid core sample made from PP-0.5 wt. % Gr (B:PP-0.5 Gr Solid Core); a foam core sample made from PP and having a 10% weight reduction compared to the PP solid core (G:PP Foam Core); a foam core sample made from PP-1 wt. % Gr foam core and having a 10% weight reduction compared to the PP solid core (H: PP-1 Gr Foam Core); a composite structure sample made from a PP-0.5 wt. % Gr foam core having a 10% weight reduction compared to the PP solid core and sandwiched between a pair of 1.0 mm thick PP-1 wt. % Gr overmolded skins (I: PP-0.5 Gr Foam Core w/ 1.5 mm 1 Gr Skins); and a composite structure sample made from a PP-0.5 wt. % Gr foam core having a 10% weight reduction compared to the PP solid core and sandwiched between a pair of 1.5 mm thick PP-1 wt. % Gr overmolded skins (J: PP-0.5 Gr Foam Core w/ 1.0 mm PP-1 Gr Skins).

DETAILED DESCRIPTION

The present disclosure provides a composite structure made from a polymer with additions of graphene (referred to herein simply as "polymer-graphene" or "polymer-graphene" material). The composite structure, i.e., a component made from the polymer-graphene material, has a reduced weight and an increase in at least one mechanical property compared to a component made simply from the polymer. The composite structure can include a polymer-graphene foam core (layer) and at least one polymer-graphene solid skin (also referred to herein simply as "polymer-graphene skin") attached or overmolded onto the polymer-graphene foam core. For example, the composite structure includes a composite structure panel with a polymer-graphene foam core sandwiched between a pair of polymer-graphene skins. And when compared to a panel having just a foam core made from the polymer (without graphene), the composite structure panel exhibits an increase in flexural strength, elastic modulus, and energy absorption. In the alternative, or in addition to, the composite structure panel has a reduced weight compared to a panel with a polymer (without graphene) solid core or a polymer-graphene solid core.

Figure 1:
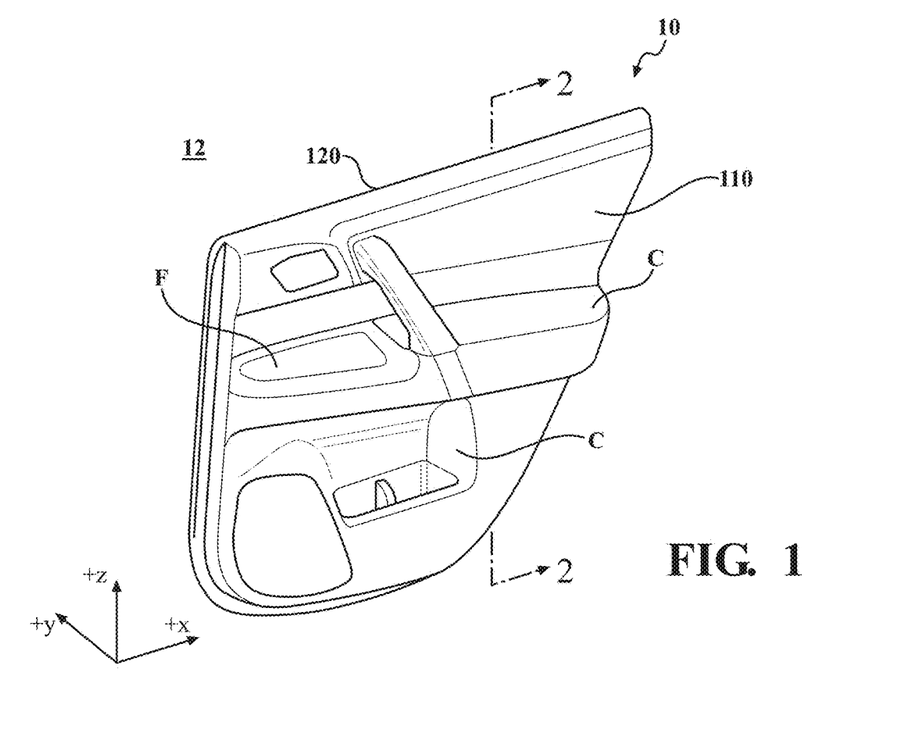
FIG. 1 is a perspective view of a panel according to the teachings of the present disclosure.
Figure 2:
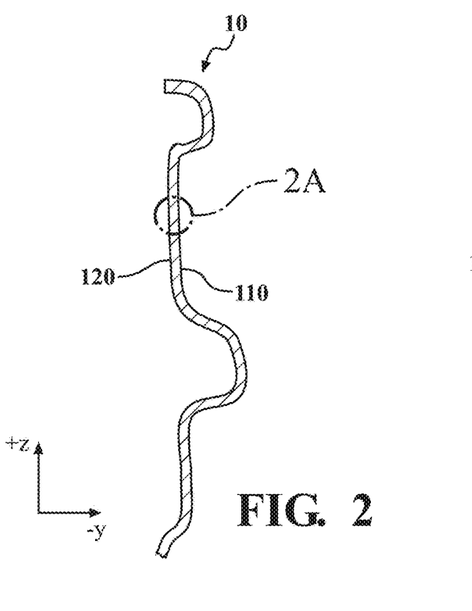
FIG. 2 is a cross-sectional view of section 2-2 in FIG. 1.
Figure 2A:
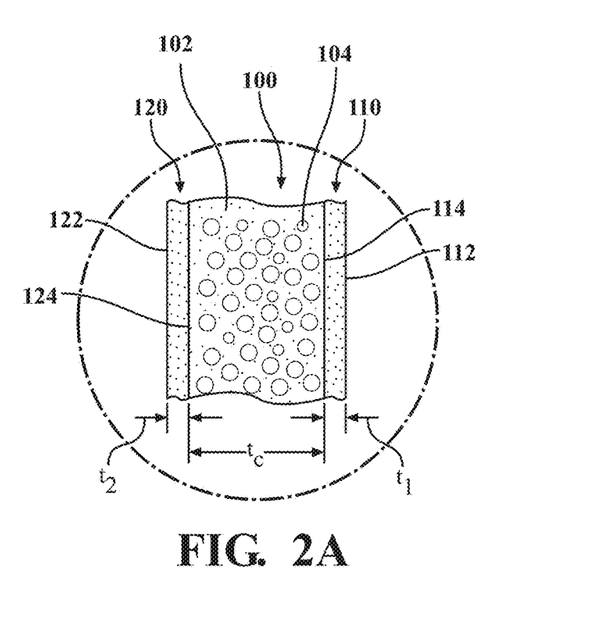
FIG. 2A is an enlarged view of section 2A in FIG. 2.

Referring to FIGS. 1, 2, and 2A, one non-limiting example of a panel 10 with a composite structure according to the teachings of the present disclosure is shown. Particularly, a perspective view of an interior door panel 10 (referred to herein simply as "door panel") for a vehicle 12 is shown in FIG. 1 and a cross-sectional view of section 2-2 in FIG. 1 is shown in FIG. 2. The door panel 10 has a plurality of contours "C" and features 'F' (e.g., a handle and a door pocket, among others) that provide a desired geometric, mechanical and/or aesthetic function. It should be understood that such panels are assembled with other panels or components during the assembly line manufacture of the vehicle. In addition, such panels can serve one or more functions during use of the vehicle, e.g., energy absorption during an impact event. It should also be understood that while FIGS. 1, 2, and 2A represent a door panel, other panels such as others panels that are included in the interior of a vehicle, panels that are included in an engine compartment of a vehicle, panels that are included in a trunk compartment of a vehicle, and panels that are included within other panels or structures of a vehicle, among others, are included within the teachings of the present disclosure.

Referring particularly to FIGS. 2 and 2A, the door panel 10 includes a foam core 100 (also known as a "foam layer" or an "inner foam layer") and at least one solid skin 110, 120. The foam core 100 includes a matrix 102 with a plurality of pores or cells 104 disposed within the matrix 102. In some variations of the present disclosure the foam core 100 is sandwiched between a first solid skin 110 with an inner facing surface 112 (i.e., a surface facing an interior of the vehicle 12) and a second solid skin 120 with an outer facing surface 122 (i.e., a surface facing an exterior of the vehicle 12). The first solid skin 100 has a first thickness 't1', the second solid skin 110 has a second thickness 't2', and the foam core has a foam core thickness 'tc'. The first thickness t1 and the second thickness t2 are between about 0.25 millimeters (mm) and about 5.0 mm. In at least one variation, the first thickness t1 and the second thickness t2 are between about 0.5 mm and about 4.0 mm, for example, between about 0.75 mm and about 3.0 mm. And in some variations, the first thickness t1 and the second thickness t2 are between about 1.0 mm and about 1.5 mm. In some variations, the first thickness t1 and the second thickness t2 are the about the same thickness, while in other variations the first thickness t1 and the second thickness t2 are different thicknesses. The foam core thickness tc is between about 1.0 mm and about 25 mm. In some variations, the foam core thickness tc is between about 2.0 mm and about 15 mm, for example, between about 2.5 mm and about 10 mm. In at least one variation, the foam core thickness tc is between about 3.0 mm and about 7.5 mm.

In some variations, a ratio of foam thickness tc to total skin thickness t1+t2 (hereafter referred to as a' which equals tc/(t1+t2)×100) is between (in percent) 1% and 500%. In at least one variation, R is between 1% and 100%, and in some variations R is between 1% and 50%. In more than variation, R is between 1% and 25%, and in some variations R is between 2% and 20%.

In some variations, the first solid skin 110 has an inner surface 114 in direct contact with the foam core 100 and the second solid skin 120 has an inner surface 124 in direct contact with the foam core 100. However, it should be understood that in at least one variation one or more layers are disposed between the inner surface 114 of the first solid skin 110 and the foam core 100 and/or one or more layers are disposed between the inner surface 124 of the second solid skin 120 and the foam core 100.

In some variations, the foam core 100 is made from a first polymer containing a desired amount of graphene (referred to herein as "first polymer-graphene material"). Non-limiting examples of the first polymer include thermoplastics such as polypropylene (PP), polyethylene (PE), polystyrene (PS), polycarbonate (PC), polyvinyl chloride (PVC), polylactic acid (PLA), polycarbonate (PC), and mixtures thereof, among others, and thermoset resins such as polyurethane (PU), polybutylene terephthalate (PBT), polyamide 6 (PA6), polyamide 66 (PA66), and mixtures thereof, among others. In at least one variation the first polymer is PP. Also, the amount of graphene in the first polymer-graphene material is between about 0.25 weight percent (wt. %) and about 5.0 wt. % graphene. For example, in some variations the first polymer-graphene material contains between about 0.5 wt. % and about 2.5 wt. % graphene, and in at least one variation the first polymer-graphene material contains between about 0.5 wt. % and about 1.0 wt. % graphene.

In some variations, the first solid skin 110 and/or the second solid skin 120 are/is made from a second polymer containing a desired amount of graphene material (referred to herein as "second polymer-graphene material"). Non-limiting examples of the second polymer include the examples noted above for the first polymer, among others. Also, the amount of graphene in the second polymer-graphene material is between about 0.25 weight percent (wt. %) and about 5.0 wt. % graphene. For example, in some variations the second polymer-graphene material contains between about 0.5 wt. % and about 2.5 wt. % graphene, and in at least one variation the second polymer-graphene material contains between about 0.5 wt. % and about 1.0 wt. % graphene.

In some variations, the first polymer and the second polymer are the same polymer, while in other variations the first polymer and the second polymer are not the same polymer. Also, in at least one variation the first solid skin 110 and the second solid skin 120 are made from different polymers. Accordingly, it should be understood that the door panel 10, and other panels or components disclosed herein, can be made using one polymer material, two different polymer materials, three different polymer materials, and more.

Figure 3:
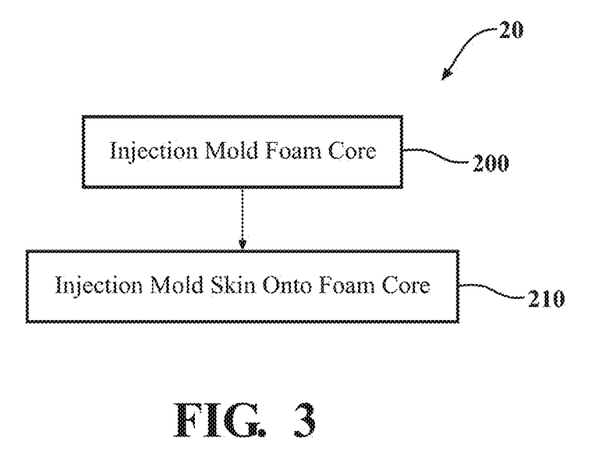
FIG. 3 is a method for manufacturing a polymer-graphene composite structure according to one form of the present disclosure.

Referring now to FIG. 3, a method 20 for manufacturing the panel 10 according to one form of the present disclosure is shown. The method 20 includes injection molding the foam core 100 at 200 and then injection molding at least one of the first solid skin 110 and the second solid skin 120 onto the foam core 100 at 210. Accordingly, in some variations the first solid skin 110 and/or the second solid skin 120 are overmolded onto the foam core 100. For example, in some variations the first solid skin 110 and/or the second solid skin 120 are overmolded onto the foam core 100 using an overmolding injection molding process, while in other variations the first solid skin 110 and/or the second solid skin 120 are overmolded onto the foam core 100 using a two-shot injection molding process. It should be understood that the first polymer-graphene material and the second polymer-graphene material are supplied or fed into an injection molding machine "pre-mixed." That is, a desired amount of graphene mixed with a polymer is fed into an injection molding machine, which in turn injection molds at least one of the foam core 100, first solid skin 110, and second solid skin 120.

Figure 4:
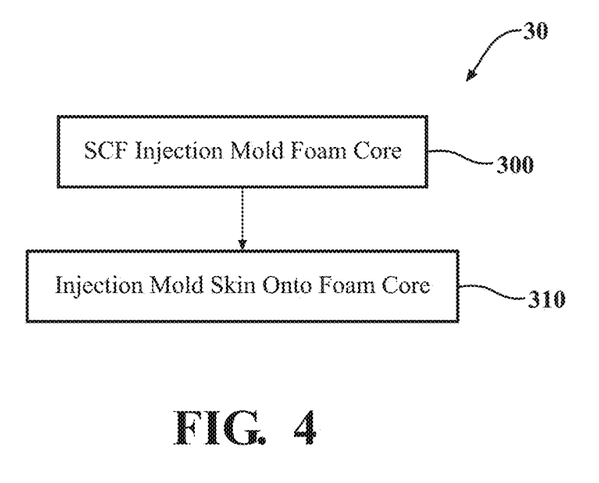
FIG. 4 is a method for manufacturing a polymer-graphene composite structure according to another form of the present disclosure.

Referring to FIG. 4, a method 30 for manufacturing the panel 10 according to another form of the present disclosure is shown. The method 30 includes supercritical fluid (SCF) injection molding the foam core 100 at 300 and then injection molding at least one of the first solid skin 110 and the second solid skin 120 onto the foam core 100 at 210. That is, the foam core 100 is SCF injection molded and the at least one of the first solid skin 110 and the second solid skin 120 are injection molded onto the foam core 100 without use or employment of SCF. It should be understood that SCF injection molding includes injecting and mixing a SCF (e.g., nitrogen or carbon dioxide) into a melt of polymer material that is in a barrel of an injection molding machine such that a combination of heat and pressure in the barrel provides a single-phase polymer/gas material. The single-phase polymer/gas material is then injected into a mold cavity (e.g., for the foam core 100) where a reduction in pressure results in the gas coming out of the polymer (solution) and forming gas bubbles or pores within a polymer matrix.

Figure 5:
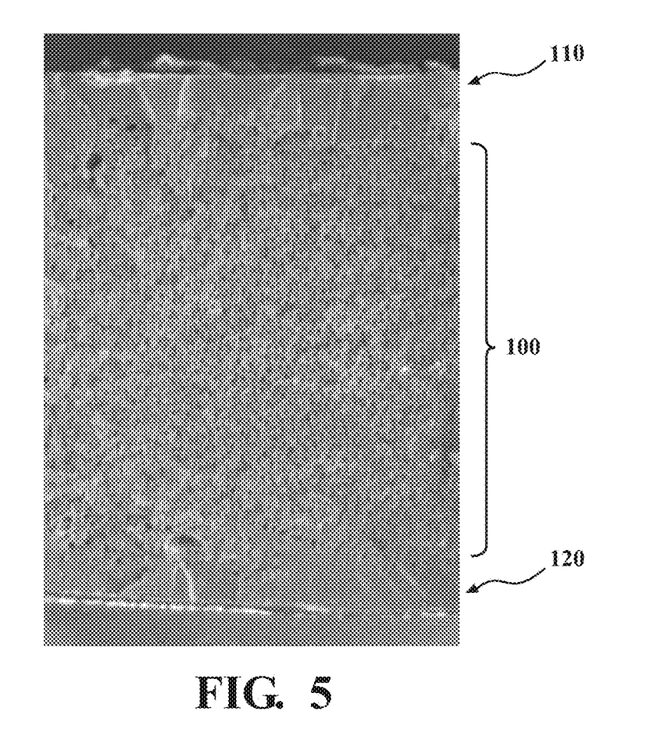
FIG. 5 is a scanning electron microscopy (SEM) micrograph of a composite structure according to the teachings of the present disclosure.

Samples with a range of structures and graphene contents were injected molded and used for SEM microstructure analysis and mechanical testing. The samples were made by injection molding the samples using pellets of pure PP (PP pellets), or by injection molding the samples using PP pellets mixed with pellets of a PP-graphene material (Product No. XGPP C6301F, XG Sciences, Lansing, Michigan, USA), such that samples with a desired amount of graphene were formed. A representative SEM image of a sample cross-section with a foam core 100 sandwiched between a first solid skin 110 and a second solid skin 120 is shown in FIG. 5.

Figure 6A:
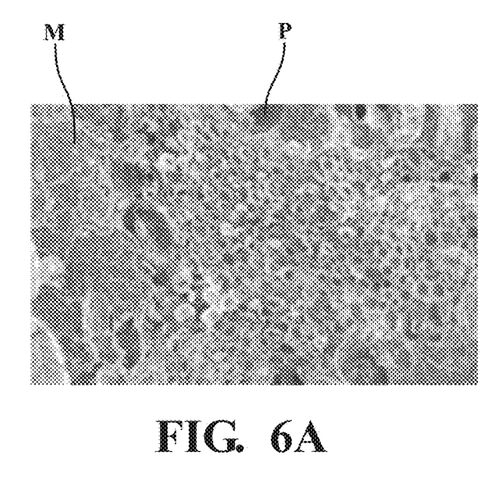
FIG. 6A is an SEM micrograph of a polypropylene (PP) foam core with a 5% weight reduction compared to a PP solid core.
Figure 6B:
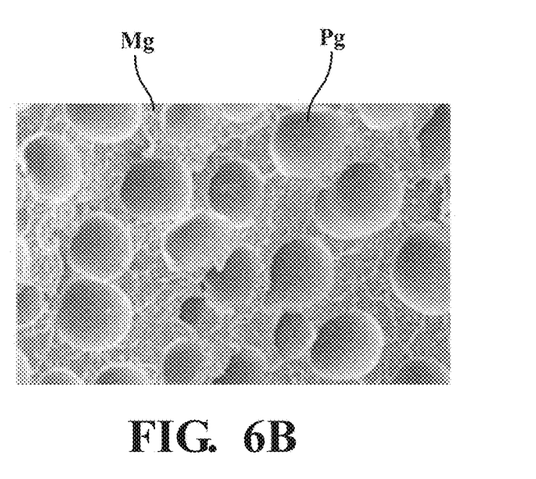
FIG. 6B is an SEM micrograph of a PP-0.5 wt. % graphene foam core with a 5% weight reduction compared to a PP solid core according to the teachings of the present disclosure.

Referring to FIGS. 6A-6B, SEM cross-sectional images of non-limiting examples of foam cores that had a 5% reduction in weight compared to a solid core are shown. The foam core shown in FIG. 6A is a PP foam core (without graphene) and the foam core shown in FIG. 6B is a PP-1.0 wt. % graphene foam core, i.e., the foam core shown in FIG. 6B was formed from or with PP with 1.0 wt. % graphene. The PP foam core shown in FIG. 6A has pores "P" within a PP matrix "M" and the PP-1.0 wt. % graphene foam core shown in FIG. 6B has pores "Pg" within a matrix "Mg" of the PP-1.0 wt. % material. In addition, and as observed from a comparison of FIG. 6A and FIG. 6B, the PP-1.0 wt. % graphene foam core has a more uniform distribution of pores and a more uniform distribution of pore size that the PP foam core.

Figure 7A:
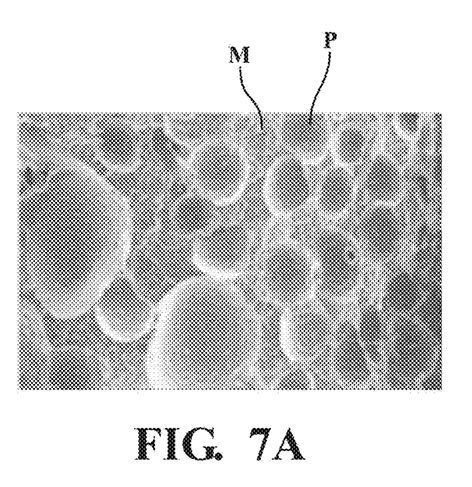
FIG. 7A is an SEM micrograph of a PP foam core with a 10% weight reduction compared to a PP solid core.
Figure 7B:
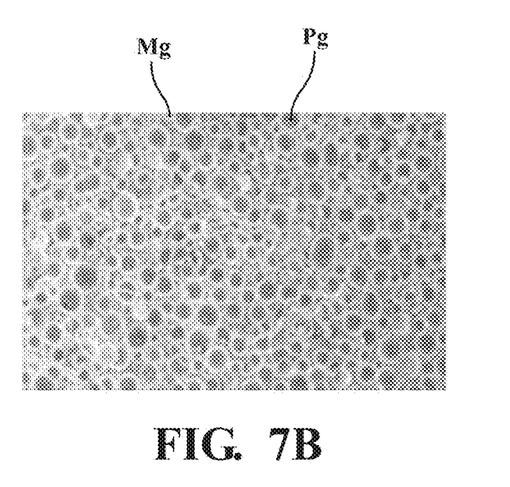
FIG. 7B is an SEM micrograph of a PP-graphene foam core with a 10% weight reduction compared to a PP solid core according to the teachings of the present disclosure.

Referring to FIGS. 7A-7B, SEM cross-sectional images of samples with foam cores that had a 10% reduction in weight compared to a solid core are shown. The foam core shown in FIG. 7A is a PP foam core and the foam core shown in FIG. 7B is a PP-1.0 wt. % graphene foam core. The PP foam core shown in FIG. 7A has pores P within a matrix M of the PP material and the PP-1.0 wt. % graphene foam core shown in FIG. 7B has pores Pg within a matrix Mg of the PP-1.0 wt. % graphene material. In addition, and as observed from a comparison of FIGS. 7A and 7B, the PP-1.0 wt. % graphene foam core has a reduced pore size, a more uniform distribution of pore size, and an increased pore density than the PP foam core. Particularly, image analysis of the PP foam core shown in FIG. 7A determined an average pore size of 183.2 micrometers (μm) with a standard deviation of +/−96.8 μm and a pore density of $4.37 \times 10^5$ pores per square millimeter (pores/mm$^2$). In contrast, image analysis of the PP-1.0 wt. % graphene foam core shown in FIG. 7B determined an average pore size of 49.3 μm with a standard deviation of +/−12.8 μm and a pore density of $5.42 \times 10^6$ pores/mm$^2$. Accordingly, the addition of graphene in the PP material reduced the pore size by a factor of about 3.7, reduced the standard deviation of the pore size by a factor of about 7.5, and increased the pore density by a factor of about 12.

Figure 8A:
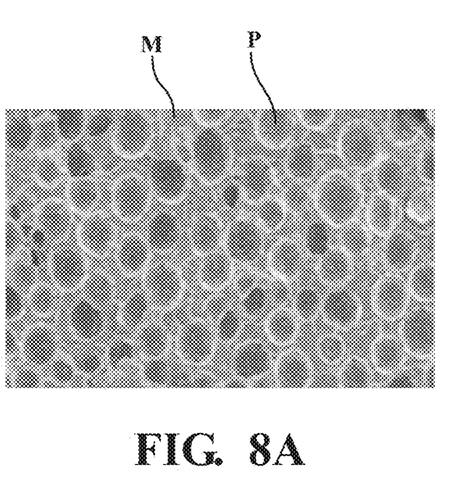
FIG. 8A is an SEM micrograph of a PP foam core with a 15% weight reduction compared to a PP solid core.
Figure 8B:
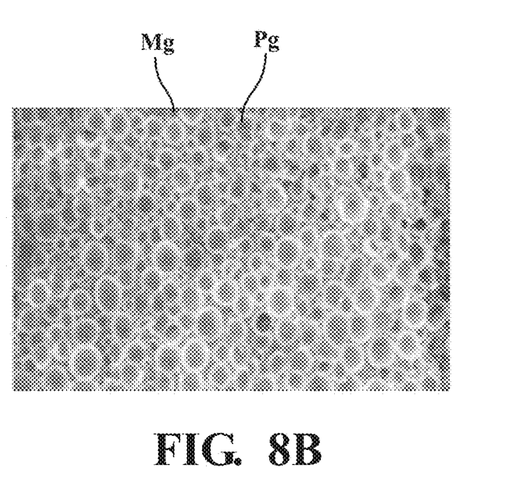
FIG. 8B is an SEM micrograph of a PP-graphene foam core with a 15% weight reduction compared to a PP solid core according to the teachings of the present disclosure.

Referring to FIGS. 8A-8B, SEM cross-sectional images of samples with foam cores that had a 15% reduction in weight compared to a solid core are shown. The foam core shown in FIG. 8A is a PP foam core and the foam core shown in FIG. 8B is a PP-1.0 wt. % graphene foam core. The PP foam core shown in FIG. 8A has pores P within a matrix M of the PP material and the PP-1.0 wt. % graphene foam core shown in FIG. 8B has pores Pg within a matrix Mg of the PP-1.0 wt. % material. In addition, and as observed from a comparison of FIGS. 8A and 8B, the PP-1.0 wt. % foam core has a reduced pore size, a more uniform distribution of pore size, and an increased pore density than the PP foam core. Particularly, image analysis of the PP foam core shown in FIG. 8A determined an average pore size of 90.5 μm with a standard deviation of +/−11.9 μm and a pore density of $6.99 \times 10^5$ pores/mm$^2$. In contrast, image analysis of the PP-1.0 wt. % graphene foam core shown in FIG. 8B determined an average pore size of 49.7 μm with a standard deviation of +/−7.0 μm and a pore density of $5.1 \times 10^6$ pores/mm$^2$ Accordingly, the addition of graphene in the PP material reduced the pore size by a factor of about 1.8, reduced the standard deviation of the pore size by a factor of about 1.7, and increased the pore density by a factor of about 7.3.

Figure 9:
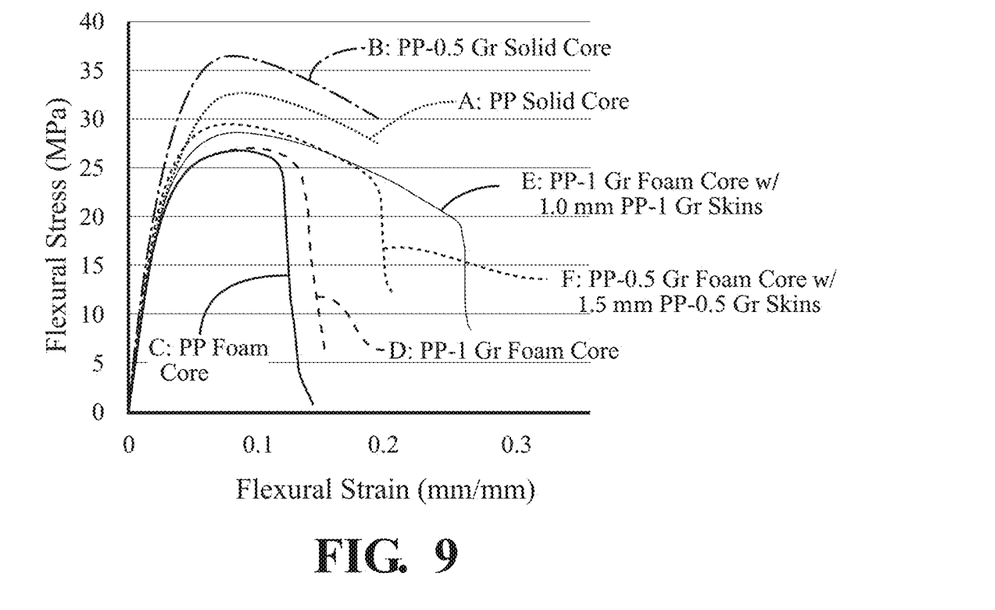
Figure 10:
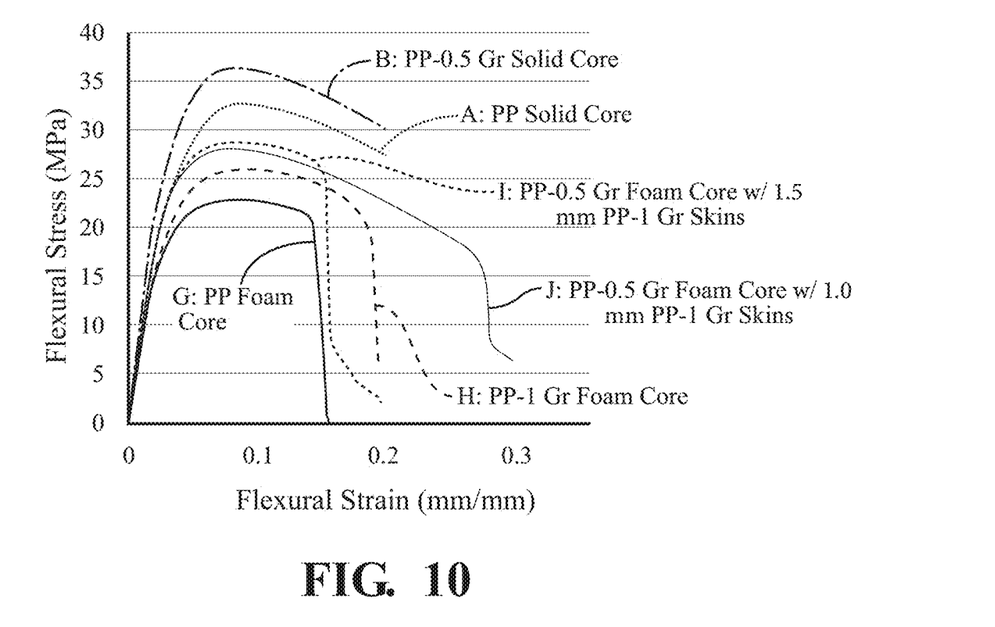

A list of samples with corresponding structure, graphene content, and labels used in FIGS. 9-10 is shown in Table 1 below.

TABLE 1

Sample data for cores and skins with varying graphene content.

| | | Core | | Skin | | |
|---|---|---|---|---|---|---|
| Sample | Type | % Weight reduction | Wt. % graphene | Thickness (mm) | Wt. % graphene | Label |
| A | solid | N/A | 0 | 0 | N/A | A: PP Solid Core |
| B | solid | N/A | 0.5 | 0 | N/A | B: PP-0.5 Gr Solid Core |
| C | foam | 5 | 0 | 0 | N/A | C: PP Foam Core |
| D | foam | 5 | 1 | 0 | N/A | D: PP-1 Gr Foam Core |
| E | foam | 5 | 1 | 1 | 1 | E: PP-1 Gr Foam Core w/ 1.0 mm PP-1 Gr Skins |
| F | foam | 5 | 0.5 | 1.5 | 0.5 | F: PP-0.5 Gr Foam Core w/ 1.5 mm PP-0.5 Gr Skins |
| G | foam | 10 | 0 | 0 | N/A | G: PP Foam Core |
| H | foam | 10 | 1 | 0 | N/A | H: PP-0.5 Gr Foam Core |
| I | foam | 10 | 0.5 | 1.5 | 1 | I: PP-0.5 Gr Foam Core w/ 1.5 mm PP-1 Gr Skins |
| J | foam | 10 | 0.5 | 1.0 | 1 | J: PP-0.5 Gr Foam Core w/ 1.0 mm PP-1 Gr Skins |

With reference to FIG. 9, graphical plots of flexure stress versus flexure strain testing for samples with a foam core having a 5% reduction in weight compared to samples with a solid foam core are shown (Samples A-F). The modulus normalized to 100 MPA, strength normalized to 100 MPa, and energy absorption normalized to 100 J (calculated from the area under the stress versus strain curve) for samples having a foam core (samples C-F) are shown in Table 2 below. In addition, percent improvement compared to the PP foam core sample C with a 5% reduction (sample C) is shown in Table 2.

TABLE 2

Calculated data from observations of samples C to F.

| Sample | Normalized Modulus (MPA) | % Improvement (modulus) | Normalized Strength (MPA) | % Improvement (strength) | Normalized Energy Absorption (J) | % Improvement (energy) |
|---|---|---|---|---|---|---|
| C | 100 | N/A | 100 | N/A | 100 | N/A |
| D | 102.27 | 2.27 | 109.13 | 9.13 | 113.59 | 13.59 |
| E | 109.89 | 9.89 | 116.67 | 16.67 | 199.89 | 99.89 |
| F | 106.93 | 6.93 | 111.15 | 11.15 | 120.07 | 20.07 |

For the samples tested per FIG. 9, sample E: PP-1 Gr Foam Core w/ 1.0 mm PP-1 Gr Skins exhibited the largest increase in modulus (9.89%), strength (16.67%), and energy absorption (99.89%) compared to sample C:PP Foam Core.

With reference to FIG. 10, graphical plots of flexure stress versus flexure strain testing for samples with a foam core having a 10% reduction in weight compared to samples with a solid foam core are shown (Samples, A, B, G-J). The modulus normalized to 100 MPa, strength normalized to 100 MPa, and energy absorption normalized to 100 J (calculated from the area under the stress versus strain curve) for samples having a foam core (samples G-J) are shown in Table 3 below. In addition, percent improvement compared to the PP foam core sample with a 10% weight reduction (sample G) is shown in Table 3.

TABLE 3

Calculated data from observations of samples G to J.

| Sample | Normalized Modulus (MPA) | % Improvement (modulus) | Normalized Strength (MPA) | % Improvement (strength) | Normalized Energy Absorption (J) | % Improvement (energy) |
|---|---|---|---|---|---|---|
| G | 100 | N/A | 100 | N/A | 100 | N/A |
| H | 106.41 | 6.41 | 108.55 | 8.55 | 132.55 | 32.55 |
| I | 120.38 | 20.38 | 116.67 | 16.67 | 152.10 | 52.10 |
| J | 118.46 | 18.46 | 115.43 | 15.43 | 115.43 | 102.98 |

For the samples tested per FIG. 10, sample I: PP-0.5 Gr Foam Core w/ 1.5 mm PP-1 Gr Skins exhibited the largest increase in modulus (20.38%) and strength (16.67%), and sample J: PP-0.5 Gr Foam Core w/ 1.0 mm PP-1 Gr Skins exhibited the largest increase in energy absorption (102.98%) compared to sample G: PP Foam Core.

Accordingly, it should be understood that the present disclosure provides composite structures with a combination of the polymer-graphene foam core and polymer-graphene solid skins that exhibit improved mechanical properties compared to structures made simply from polymer.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A component comprising:
    a composite structure comprising a closed cell foam core, and an overmolded skin disposed on the closed cell foam core,
    wherein the closed cell foam core comprises a first polymer-graphene material with between about 0.5 wt. % and about 1.0 wt. % 2D graphene, an average pore size between about 25 µm and about 75 µm, and a cross-section pore density between about $4\times10^6$ cells/mm$^2$ and about $6\times10^6$ cells/mm$^2$,
    wherein the overmolded skin comprises a second polymer-graphene material with between about 0.5 wt. % and about 1.0 wt. % 2D graphene, and
    wherein the closed cell foam core weighs at least 5% less than a solid core formed from the first polymer and the composite structure exhibits an increase in energy absorption of at least 50% compared to a closed cell foam core formed from the first polymer without graphene.

2. The component according to claim 1, wherein the first polymer and the second polymer are the same polymer.

3. The component according to claim 1, wherein the first polymer and the second polymer are polypropylene.

4. The component according to claim 1, wherein the energy absorption increase is at least 75%.

5. The component according to claim 1, wherein the first polymer-graphene material and the second polymer-graphene material comprises at least one of polypropylene, polyethylene, polystyrene, polycarbonate, polyvinyl chloride, polylactic acid, polycarbonate, polyurethane, polybutylene terephthalate, polyamide 6, and polyamide 66.

6. A method of manufacturing a component, the method comprising:
    injection molding a closed cell foam core from a first polymer-graphene material with between about 0.5 wt. % and about 1.0 wt. % 2D graphene,
    wherein the closed cell foam core comprises an average pore size between about 25 µm and about 75 µm, and a cross-section pore density between about $4\times10^6$ cells/mm$^2$ and about $6\times10^6$ cells/mm$^2$; and
    injection molding an overmolded skin on the closed cell foam core to form a composite structure, wherein the overmolded skin is formed from a second polymer-graphene material with between about 0.5 wt. % and about 1.0 wt. % 2D graphene, and
    wherein the closed cell foam core weighs at least 5% less than a solid core formed from the first polymer and the composite structure exhibits an increase in energy absorption of at least 50% compared to a closed cell foam core formed from the first polymer without graphene.

7. The method according to claim 6, wherein the injection molding of the foam core comprises supercritical fluid injection molding of the foam core.

\* \* \* \* \*